W. L. FISH.
Improvement in Mechanism for Operating Bobbin Winding Attachment for Sewing Machines.

No. 123,625. Patented Feb. 13, 1872.

Witnesses:
A. Bennewendorf
Geo. W. Mabee

Inventor:
W. L. Fish
per Munn & Co.
Attorneys.

UNITED STATES PATENT OFFICE.

WARREN L. FISH, OF NEWARK, NEW JERSEY.

IMPROVEMENT IN MECHANISMS FOR OPERATING BOBBIN-WINDING ATTACHMENTS FOR SEWING-MACHINES.

Specification forming part of Letters Patent No. 123,625, dated February 13, 1872.

Specification describing a new and useful Improvement in Bobbin-Winders for Sewing-Machines, invented by WARREN L. FISH, of Newark, in the county of Essex and State of New Jersey.

Figure 1:
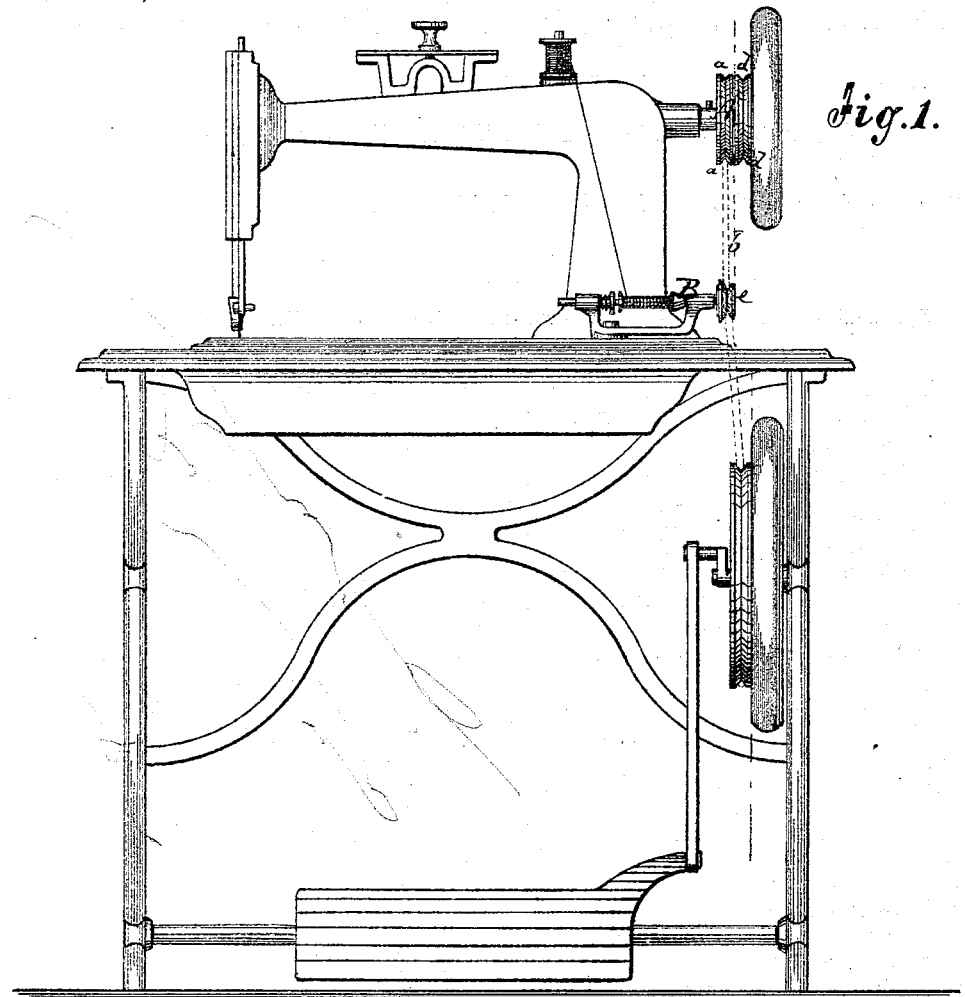
Figure 2:
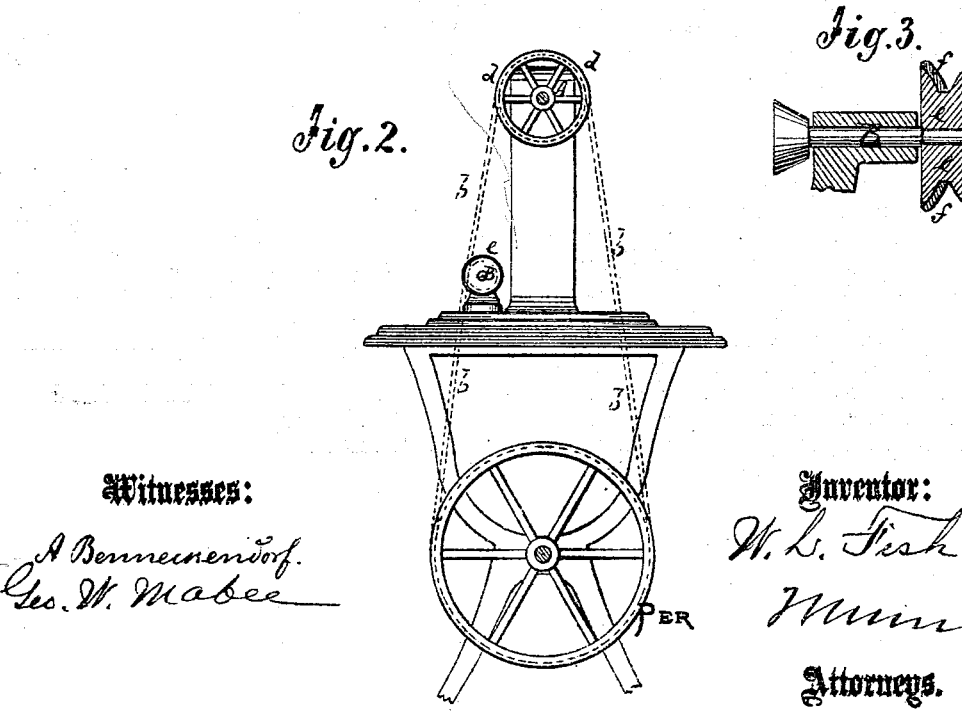
Figure 3:
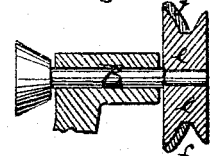

Figure 1 represents a side elevation, partly in section, of a sewing-machine containing my invention. Fig. 2 is an end view of the same. Fig. 3 is a detail central section of the arbor containing bobbin-winding pulley.

Similar letters of reference indicate corresponding parts.

The object of this invention is to devise means for operating a bobbin-winder on a sewing-machine without at the same time necessarily operating the machine itself. Usually bobbin-winding attachments are so arranged that they can, at any time, be thrown into gear with the operating mechanism of the machine, and all parts of the machine are moved whenever the bobbin-winder is operated, and if the thread gives out while sewing the work is removed from the machine to permit the winding of a new bobbin. Apart from this inconvenience, much power is wasted in this unnecessarily moving parts of the machine. My invention consists in the arrangement of means whereby the driving-power of the machine can be transferred to the bobbin-winder, so that the machine will be at rest while the latter is in operation, and vice versa.

My object is principally attained by the application of a loose pulley, $a$, to the main shaft A of the sewing-machine. The belt B, which imparts rotary motion to the shaft A by passing around a fast pulley, $d$, thereon, can at any time be slipped off the pulley $d$ and transferred to the equal-sized loose pulley $a$, so that all power of the belt will be taken from the shaft A, and no further motion imparted to the same. B is the driving-arbor of the bobbin-winder. It carries a friction-pulley, $e$, which is in line with the loose pulley $a$ in such manner that when the belt is transferred to the pulley $a$ it will thereby also be brought in contact with the edge of the pulley $e$. When, however, the belt is on the pulley $d$, it will not be in contact with $e$. Thus, it will be seen that when the machine is in operation the bobbin-winder will be at rest, and that when the bobbin-winder is in motion the machine proper is at rest. All the aforementioned difficulties are thereby entirely overcome. In order to insure the desired effect of the belt $b$ on the bobbin-winder, I consider it advisable to so prepare the edge of the pulley $e$ that it will be sure to be revolved when the belt is in contact with it, even should the belt be somewhat slack. For this purpose I insert within the groove of the pulley $e$ an annular piece, $f$, of rubber or equivalent material, which, when in contact with the material of the belt, will cause it to adhere better than it would to the metal or material of which the pulley proper consists. The ring $f$, being inclined, serves also to crowd the belt into the bottom of the groove, and insures its taking proper hold. There may, if desired, be two such rings placed against the opposite sides of the groove in $e$, or a grooved ring of rubber or leather may be slipped over the smooth edge of the pulley $e$, in which case the entire outer edge of the said pulley would be made of the elastic material.

Having thus described my invention, I claim as new and desire to secure by Letters Patent—

In sewing-machines, the loose pulley $a$, fast pulley $d$, and bobbin-pulley $e$, arranged, with respect to each other and to the crank-shaft pulley, as described, to enable the same belt to operate the sewing mechanism and the bobbin-winder at different times, and in the manner set forth.

WARREN L. FISH.

Witnesses:
GEO. W. MABEE,
T. B. MOSHER.